United States Patent
Hans et al.

(10) Patent No.: US 9,243,153 B2
(45) Date of Patent: Jan. 26, 2016

(54) POLYISOCYANATE ADDUCTS AS ADDITIVES FOR RADIATION-CURABLE COATING MATERIAL COMPOSITIONS

(71) Applicant: BYK-Chemie GmbH, Wesel (DE)

(72) Inventors: Marc Hans, Wesel (DE); Wojciech Jaunky, Wesel (DE); Jürgen Hartmann, Oberhausen (DE); Jürgen Omeis, Dorsten-Lembeck (DE)

(73) Assignee: BYK-Chemie GmbH (DE)

( * ) Notice: Subject to any disclaimer, the term of this patent is extended or adjusted under 35 U.S.C. 154(b) by 0 days.

(21) Appl. No.: 14/384,463

(22) PCT Filed: Mar. 12, 2013

(86) PCT No.: PCT/EP2013/054985
§ 371 (c)(1),
(2) Date: Sep. 11, 2014

(87) PCT Pub. No.: WO2013/135686
PCT Pub. Date: Sep. 19, 2013

(65) Prior Publication Data
US 2015/0111980 A1    Apr. 23, 2015

(30) Foreign Application Priority Data
Mar. 12, 2012 (EP) .................... 12159061

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 7/12* | (2006.01) | |
| *C08G 18/67* | (2006.01) | |
| *C08G 18/79* | (2006.01) | |
| *C08G 18/28* | (2006.01) | |
| *C09D 175/16* | (2006.01) | |
| *C08G 77/388* | (2006.01) | |
| *C08G 77/46* | (2006.01) | |
| *C09D 5/16* | (2006.01) | |
| *C08G 18/61* | (2006.01) | |
| *C09D 167/07* | (2006.01) | |

(52) U.S. Cl.
CPC .............. *C09D 7/125* (2013.01); *C08G 18/289* (2013.01); *C08G 18/61* (2013.01); *C08G 18/672* (2013.01); *C08G 18/792* (2013.01); *C08G 77/388* (2013.01); *C08G 77/46* (2013.01); *C09D 5/1637* (2013.01); *C09D 167/07* (2013.01); *C09D 175/16* (2013.01)

(58) Field of Classification Search
CPC .... C09D 7/125; C09D 167/07; C09D 175/16; C09D 5/1637; C08G 18/289; C08G 18/61; C08G 18/792; C08G 18/672; C08G 77/46; C08G 77/388; C08L 83/12; C08L 83/08
USPC ......... 522/21, 13, 7, 6, 71, 189, 184, 1, 8, 22; 520/1
See application file for complete search history.

(56) References Cited

U.S. PATENT DOCUMENTS

2007/0112164 A1* 5/2007 Roesler et al. .................. 528/44

FOREIGN PATENT DOCUMENTS

| JP | 200645504 A | 2/2006 |
| JP | 2008-156435 A | 7/2008 |
| JP | 2010-095695 A | 4/2010 |
| WO | WO-9918043 A1 | 4/1999 |
| WO | WO-2013135686 A1 | 9/2013 |

OTHER PUBLICATIONS

"International Application Serial No. PCT/EP2013/054985, International Preliminary Report of Patentabitlity mailed on Mar. 12, 2013", 6 pgs.
"International Application Serial No. PCT/EP2013/054985, International Search Report mailed Apr. 25, 2013", w/English translation, 6 pgs.
"International Application Serial No. PCT/EP2013/054985, Written Opinion mailed Apr. 25, 2013", 5 pgs.

* cited by examiner

*Primary Examiner* — Ling Choi
*Assistant Examiner* — Jessica E Whiteley
(74) *Attorney, Agent, or Firm* — Schwegman Lundberg & Woessner, P.A.

(57) ABSTRACT

The invention relates to polyisocyanate adducts obtainable by reacting at least one polysiloxane of the structure (I), at least one polyisocyanate having at least three NCO groups, at least one (meth)acrylate of the structure (II), where U is one of the following groups: (III), and optionally a compound reactive with isocyanates. The indices m, n, x and y assume values of 0 to 100. In addition, t=2 to 30, s=1 to 400 and i=1 to 5. The radicals identified by the letter R are suitable organic groups. $A^{Si}$ is an OH—, $NH_2$— or $CO_2H$— group. In addition, m+n+x+y≥3. The invention further relates to a process for preparing the polyisocyanate adducts and to a radiation-curable coating composition comprising at least one radiation-curable polymer as a binder and at least one inventive polyisocyanate adduct. The invention further relates to the use of the inventive polyisocyanate adducts as an additive.

14 Claims, No Drawings

POLYISOCYANATE ADDUCTS AS ADDITIVES FOR RADIATION-CURABLE COATING MATERIAL COMPOSITIONS

PRIORITY APPLICATIONS

This application is a U.S. National Stage Filing under 35 U.S.C. 371 from International Application No. PCT/EP2013/054985, filed on 12 Mar. 2013, and published as WO 2013/135686A1 on 19 Sep. 2013, which claims the benefit under 35 U.S.C. 119 to EP Application No. 12159061.6, filed on 12 Mar. 2012; which applications and publication are incorporated herein by reference in their entirety.

FIELD OF THE INVENTION

The present invention relates to polyisocyanate adducts which can be used as additives in radiation-curable coating material compositions, and also to a process for their preparation. The present invention further relates to the use of the polyisocyanate adducts of the invention as additives in coating material compositions. The present invention additionally relates to coating material compositions which comprise the polyisocyanate adducts of the invention.

PRIOR ART

In the case of radiation curing, reactive monomers and oligomers are converted into high molecular mass materials by means of high-energy radiation, such as UV light or electron beams, for example. By comparison with thermal treatment, radiation curing is a very rapid process, allowing high production speeds. Furthermore, the rapid curing allows a space-saving mode of operation and imposes little impact on the materials. With respect to the environment, radiation curing offers clear advantages, such as low emission levels and a lower energy consumption, for example. Radiation curing is used, for example, in the production of coating materials, paints, printing inks, etc. The coatings are notable in many cases for improved quality, especially in terms of gloss and abrasion resistance.

Radiation-curable coatings, printing inks and/or print varnishes are described in, for example, "UV & EB Curing Formulations for Printing Inks, Coatings & Paints", R. Holman, P. Oldring, London 1988.

In view of the rapid propagation of this technology, the requirements imposed on radiation-curable compositions are rising continually and are becoming noticeably more diverse. Additization of curable compositions is one method for obtaining cured products having enhanced properties.

In order, for example, to obtain dirt-repellant coatings featuring easy-to-clean properties, it is nowadays customary to use fluorine compounds and/or silicone compounds. WO 98/03574 describes fluorine-containing α,ω-hydroxy-functional polysiloxanes which can be utilized, for example, in order to impart properties such as water repellence and oil repellence, antifouling and release properties to various industrial materials.

WO 2005/066224 A1 describes water-repellant and oil-repellant fluoroacrylates which are synthesized from urethane-containing fluorinated macromonomers.

In view of the environmental concerns leveled against perfluorinated hydrocarbons, there is a demand for fluorine-free compounds. In the context of use of additives in radiation-curable compositions, moreover, it is advantageous for the additives to be able to react with the binder, in other words to contain polymerizable groups. Incorporating the additives into the cured composition permits permanent properties and prevents the additives accumulating at the surface and resulting in a disruptive film. Furthermore, the incorporation of the additives plays an important part in the case of coatings for substrates which are used as packaging or containers in the food industry, for example. In the context of the coating for food packaging, migration and emergence of the polymers from the coating film would be found highly deleterious.

One suitable technology for the synthesis of (meth)acryloyl-functional polysiloxanes is the reaction of functional (meth)acrylates and functional polysiloxanes with at least difunctional isocyanates.

The following radiation-curable polysiloxane (meth)acrylates, comprising both urethane groups and urea groups, are likewise known from the literature and used in radiation-curable coating compositions:

"Preparation and properties of UV-curable poly(dimethylsiloxane)urethane acrylate. Chiang, Wen-Yen; Shu, Wey-Jye. Dep. Chem. Eng., Tatung Inst. Technol., Taipei, Taiwan, Angewandte Makromolekulare Chemie (1988), 160 41-66", and "Preparation and properties of UV-curable poly(dimethylsiloxane)urethane acrylate. II. Property-Structure/Molecular-weight relationships. Chiang, Wen-Yen; Shu, Wey-Jye. Dep. Chem. Eng., Tatung Inst. Technol., Taipei, Taiwan. Journal of Applied Polymer Science (1988), 36, 1889-1907", disclose UV-curable polysiloxane acrylates which contain urethane groups and are prepared on the basis of polydimethylsiloxane-α,ω-diol (PDMS), a diisocyanate, and a hydroxyethyl methacrylate. The physical properties of these UV-curable materials were investigated, particularly in relation to their dependences on the amount-of-substrate fraction of the PDMS or their dependence on the nature of the diisocyanate used. Likewise the influence of different reactive diluents and certain pigments was investigated.

"Properties of ultraviolet cured polydimethylsiloxane-urea acrylates. Yu, X.; Nagarajan, M. R.; Li, C.; Speckhard, T. A.; Cooper, S. L. Dep. Chem. Eng., Univ. Wisconsin, Madison, Wis., USA. Journal of Applied Polymer Science (1985), 30(5), 2115-2135", discloses UV-curable polysiloxane acrylates which contain urea groups and are prepared on the basis of aminopropyl-terminated polydimethylsiloxanes (ATPS) and an isocyanatoethyl methacrylate. The oligomers thus obtained are cured by UV radiation in the presence of reactive diluents. The physical properties of the UV-curable materials thus obtained were investigated especially in relation to their dependences on the amount-of-substance fraction of the ATPS or their dependence on the nature of the reactive diluent used.

Reaction products of correspondingly functionalized polysiloxanes with isocyanates and (meth)acrylates are described in the literature. For example, WO 00/12588 describes the use of such polymers in hair cosmetology. EP0937998A describes the use of polysiloxanes, linked via a urethane group to polymerizable groups, in contact lens materials.

EP 1469029 B1 describes polyestersiloxane acrylates, prepared by the reaction of α,ω-organically modified polysiloxanes with isocyanates and one or more polyester (meth)acrylates, and the use thereof in radiation-curable coatings.

WO 98/46693 A1 describes a liquid curable resin composition that leads to cured coating materials for a ribbon matrix for optical fibers and jacketing fibers having good surface slip properties. The composition comprises two different polymethylsiloxanes (PDMS). The first PDMS contains at least two urethane bonds, an organic group which is not radically polymerizable and is bonded to at least one end of the first PDMS, and a (meth)acryloyl group on at least one end of the first PDMS. The second PDMS contains at least two urethane groups and one organic group that contains no group which is radically polymerizable. Said organic group is likewise bonded to at least one end of the second PDMS. Said polymers are employed at additive levels.

On the basis of the advantages recited above, radiation-curable coating material compositions are becoming ever more important. There is therefore a continually growing need for radiation-curable compositions which comprise compatible additives that lead, not to instances of hazing and/or surface disruption, but instead to cured products having excellent surface properties. Further desires of the cured product are good surface slip properties and scratch resistance, water and oil repellence properties, and increased resistance toward soiling of all kinds.

The object of the present invention, therefore, was that of providing a radiation-curable, polysiloxane-containing additive which in comparison to the compounds known from the prior art exhibits high compatibility in a multiplicity of radiation-curable coating material compositions and coatings, and at the same time leads to excellent surface properties.

With the aid of the subject matter of the present invention, coatings having improved surface properties are to be obtained. This refers to the outstanding balance between low cratering, outstanding leveling, and reduced hazing, and other advantageous properties such as the resistance toward soiling, and also outstanding slip properties. Another object of the present invention was that of retaining advantageous properties such as low cratering, outstanding leveling, reduced hazing, and resistance toward soiling, and of further improving the slip properties relative to the prior art.

Surprisingly it has been found that the present object has been solved by means of polyisocyanate adducts which are obtainable by reacting i. at least one polysiloxane which possesses the structure (I) below

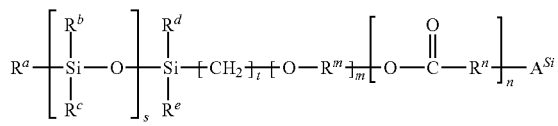

where t=2 to 30, m=0 to 100, n=0 to 100, s=1 to 400, $R^a$ is a halogenated alkyl radical having 1 to 30 carbon atoms, a linear alkyl radical having 1 to 30 carbon atoms, a branched or cyclic alkyl radical having 3 to carbon atoms, or an aryl radical having 6 to 30 carbon atoms, or an alkylaryl radical or arylalkyl radical having 7 to 30 carbon atoms, all of $R^b$, $R^c$, $R^d$ and $R^e$ independently of one another are linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms, $R^d$ and $R^e$, moreover, independently of one another may be $R^a[SiR^bR^cO]_s$, where $R^a$, $R^b$, $R^c$, and s are as defined above and are selected independently therefrom, the m (O—$R^m$) units and the n (O—CO—$R^n$) units in the structural unit [O—$R^m$]$_m$—[O—CO—$R^n$]$_n$ are arranged in any order, $R^m$ is a linear alkylene radical having 2 to 4 carbon atoms or a branched alkylene radical having 3 or 4 carbon atoms, $R^n$ is a linear alkylene radical having 2 to 6 carbon atoms or a branched alkylene radical having 3 to 6 carbon atoms, or a cyclic alkylene radical having 3 to 6 carbon atoms, the radicals $R^m$ and $R^n$ are selected independently for each of the m (O—$R^m$) units and each of the n (O—CO—$R^n$) units, and $A^{Si}$ is an OH, NH$_2$, or CO$_2$H group;

ii. at least one polyisocyanate having at least three NCO groups;

iii. at least one (meth)acrylate which possesses the structure (II) below:

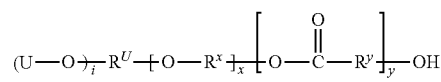

where x=0 to 100, y=0 to 100,
U is one of the following groups:

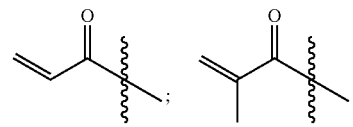

$R^U$ is a (i+1)-valent organic radical with i=1 to 5, the x (O—$R^x$) units and the y (O—CO—$R^y$) units in the structural unit [O—$R^x$]$_x$—[O—CO—$R^y$]$_y$ are arranged in any order, $R^x$ is a linear alkylene radical having 2 to 4 carbon atoms or a branched alkylene radical having 3 or 4 carbon atoms, $R^y$ is a linear alkylene radical having 2 to 6 carbon atoms or a branched alkylene radical having 3 to 6 carbon atoms, or a cyclic alkylene radical having 3 to 6 carbon atoms, the radicals $R^x$ and $R^y$ are selected independently for each of the x (O—$R^x$) units and each of the y (O—CO—$R^y$) units; and iv. optionally one or more isocyanate-reactive compounds of the structure (III), which is different from the components used under i to iii:

$R^z$-$(A^z)_z$; with z=1 or 2 where $R^z$ is an aliphatic or aromatic radical, and $A^z$ is an OH, NH$_2$, or CO$_2$H group, and m+n+x+y≥3.

In the text below, a polyisocyanate adduct is the reaction product of a polyisocyanate with compounds which contain an OH, NH$_2$, or CO$_2$H group.

The term "(meth)acrylate" herein encompasses both acrylate and methacrylate. Where i>1, it is possible for there to be exclusively acrylate groups, exclusively methacrylate groups, or both acrylate and methacrylate groups. Acrylate groups are preferably employed.

In the polysiloxane of the structure (I), t adopts values from 2 to 30 and s adopts values from 1 to 400.

Preferably t=3 to 6 and more preferably t=3. With further preference s=4 to 200.

The radical $R^a$ is a halogenated alkyl radical having 1 to 30 carbon atoms, a linear alkyl radical having 1 to 30, preferably 1 to 6, carbon atoms, a branched or cyclic alkyl radical having 3 to 30 carbon atoms, or an aryl radical having 6 to 30 carbon atoms, or an alkylaryl radical or an arylalkyl radical having 7 to 30 carbon atoms.

Preferably $R^a$ is not fluorinated. More preferably $R^a$ is not halogenated.

$R^a$ is preferably a methyl, ethyl, propyl, or butyl radical, and very preferably a methyl or a butyl radical.

The radicals $R^b$, $R^c$, $R^d$, and $R^e$ are independently of one another linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms.

The radicals $R^d$ and $R^e$ may also independently of one another be $R^a[SiR^bR^cO]_s$, where $R^a$, $R^b$, $R^c$, and s are as defined above and are selected independently therefrom.

Preferably $R^b$, $R^c$, $R^d$, and $R^e$ independently of one another are linear alkyl radicals having 1 to 6 carbon atoms, saturated branched or cyclic alkyl radicals having 3 to 6 carbon atoms, or aryl radicals having 6 to 12 carbon atoms, or alkylaryl radicals or arylalkyl radicals having 7 to 12 carbon atoms.

More preferably $R^b$, $R^c$, $R^d$, and $R^e$ independently of one another are methyl, ethyl, propyl, butyl, phenyl, or substituted phenyl radicals, very preferably methyl radicals.

The m (O—$R'''$) units and the n (O—CO—$R''$) units in the structural unit [O—$R'''$]$_m$—[O—CO—$R''$]$_n$ are arranged in any order.

The structural unit [O—$R'''$]$_m$—[O—CO—$R''$]$_n$, based on the m (O—$R'''$) units and the n (O—CO—$R''$) units, is preferably in the form of a multiblock copolymer. More preferably the structural unit [O—$R'''$]$_m$—[O—CO—$R''$]$_n$, based on the m (O—$R'''$) units and the n (O—CO—$R''$) units, is in the form of a diblock copolymer. Very preferably there are exclusively polyether groups, and no polyester groups, present. Likewise very preferably, the structure (I) contains only an (O—$R'''$) unit, and no further polyester groups.

The radical $R'''$ is a linear alkylene radical having 2 to 4 carbon atoms or a branched alkylene radical having 3 or 4 carbon atoms.

Preferably $R'''$ is an ethylene, propylene, or butylene radical, more preferably an ethylene or propylene radical, and very preferably an ethylene radical.

In the polysiloxane of the structure (I), m adopts the values 0 to 100. It is preferred for m to adopt values of m=1 to 50 and more preferably of m=1 to 25.

The radical $R''$ is a linear alkylene radical having 2 to 6 carbon atoms or a branched alkylene radical having 3 to 6 carbon atoms, or a cyclic alkylene radical having 3 to 6 carbon atoms.

Preferably $R''$ is a linear alkylene radical having 4 or 5, very preferably 5, carbon atoms.

In the polysiloxane of the structure (I), n adopts the values 0 to 100. It is preferred for n to adopt values of n=0 to 15.

The radicals $R'''$ and $R''$ are selected independently for each of the m (O—$R'''$) units and each of the n (O—CO—$R''$) units. Preferably, in a block of (O—$R'''$) units, the $R'''$ radicals are identical in all (O—$R'''$) units. It likewise preferred for there to be in total only two different kinds of radicals $R'''$ in a block of (O—$R'''$) units.

It is further preferred for the radicals $R''$ to be identical in all (O—CO—$R''$) units in a block of (O—CO—$R''$) units.

$A^{Si}$ is an OH, $NH_2$, or $CO_2H$ group. Preferably it is an OH group.

The polysiloxane of the structure (I) possesses a linear or branched structure, preferably a linear structure. The $R^a$[SiR$^b$R$^c$O]SiR$^d$R$^e$ radical of the polysiloxane of the structure (I) preferably possesses a weight-average molecular weight in the range from 200 to 30 000 g/mol, more preferably in the range from 500 to 10 000 g/mol, and very preferably in the range from 500 to 5000 g/mol.

To determine the weight-average molecular weight, the corresponding molecular weight of the corresponding mono-SiH-functional polysiloxane of the general formula $R^a$[SiR$^b$R$^c$O]SiR$^d$R$^e$—H is measured by means of gel permeation chromatography against a polystyrene standard. Tetrahydrofuran is used as eluent. The column material consists of styrene-divinyl benzene copolymers.

The polyisocyanates for use in accordance with the invention contain at least three NCO groups.

Polyisocyanates may be oligomers which contain isocyanurate, biuret, allophanate, iminooxadiazine-dione, urethane, carbodiimide, urea and/or uretdione groups. Such compounds can be prepared from diisocyanates. Corresponding reactions are given in RÖMPP Lexikon, Lacke and Druckfarben, 10th edition, Georg Thieme Verlag 1998, "Polyisocyanate" page 463.

Diisocyanates used in preparing the polyisocyanates of the invention are preferably aliphatic, cycloaliphatic, or araliphatic diisocyanates. Use is made, for example, of aryl-substituted aliphatic diisocyanates, as described in Houben-Weyl, Methoden der Organischen Chemie, volume 14/2, pages 61-70 and in an article by W. Siefken, Justus Liebig's Annalen der Chemie 562, pages 75-136. Preferred examples are ethylene 1,2-diisocyanate, tetramethylene 1,4-diisocyanate, hexamethylene 1,6-diisocyanate (HDI), 2,2,4-(2,4,4)trimethylhexamethylene 1,6-diisocyanate (TMDI), 1,9-diisocyanato-5-methylnonane, 1,8-diisocyanato-2,4-dimethyloctane, dodecane 1,12-diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-(1,4-methanolnaphthalene-2 (or 3),5-ylenedimethylene diisocyanate, hexahydro-4,7-methanoindan-1 (or 2),5 (or 6)-ylenedimethylene diisocyanate, hexahydro-4,7-methanoindan-1 (or 2),5 (or 6)-ylene diisocyanate, hexahydrotoluoylene 2,4- and/or 2,6-diisocyanate (H6-TDI), 2,4- and/or 2,6-toluoylene-diisocyanate (TDI), perhydrodiphenylmethane 2,4'-diisocyanate, perhydrodiphenylmethane 4,4'-diisocyanate ($H_{12}$MDI), 4,4'-diisocyanato-3,3',5,5' tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanato-methyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, and also any mixture of these compounds. Further preferred isocyanates are described in the aforementioned Siefken article on pages 122 ff. 2,5(2,6)-Bis(isocyanatomethyl)-bicyclo[2.2.1]heptane (NBDI) is preferably in pure form or as part of a mixture. Particularly preferred are the aliphatic and cycloaliphatic isocyanates, and their isomer mixtures, that are easily obtained industrially.

The polyisocyanates of the invention are preparable preferably by trimerization of diisocyanates. The resulting trimers are termed isocyanurates.

Particularly preferred is the use, for example, of trimers of HMDI and IPDI. Such polyisocyanates are available, for example, under the trade names Desmodur N3300 from Bayer AG and Vestanat 718907100 from Degussa AG.

It is further preferred for the polyisocyanate itself to contain no urethane groups.

In the (meth)acrylate of the structure (II), the radical U is one of the following groups:

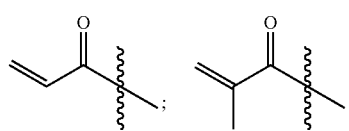

Furthermore, the radical $R^U$ is a (i+1)-valent organic radical with i=1 to 5. Preferably i=1. For i=1, $R^U$ is preferably a linear alkylene radical having 2 to 4 carbon atoms or a branched alkylene radical having 3 to 4 carbon atoms. With particular preference, for i=1, $R^U$ is an ethylene radical.

It is likewise preferred for precisely one (meth)acrylate of the structure (II) with i=1 and precisely one (meth)acrylate of the structure (II) with i>1 to be used. The fraction of the (meth)acrylate of the structure (II) with i>1 is preferably in the range from 5 to 50 mol %, more preferably in the range from 10 to 40 mol %, and very preferably in the range from 20 to 30 mol %, based in each case on the total amount of substance of the (meth)acrylate of the structure (II) with i=1 and of the (meth)acrylate of the structure (II) with i>1.

For i=2, (U—O—)$_i$—$R^U$— is preferably a corresponding trimethylolpropane radical.

For i=3, (U—O—)$_i$—$R^U$— is preferably a corresponding pentaerythritol radical.

For i=4, (U—O—)$_i$—$R^U$— is preferably a corresponding pentaerythritol trimethylol ether radical.

For i=5, (U—O—)$_i$—$R^U$— is preferably a corresponding dipentaerythritol radical.

The x (O—$R^x$) units and the y (O—CO—$R^y$) units in the structural unit [O—$R^x$]$_x$—[O—CO—$R^y$]$_y$ are arranged in any order.

In analogy to the structure (I), the structural unit [O—$R^x$]$_x$—[O—CO—$R^y$]$_y$ is preferably in the form of a multi-block copolymer, and more preferably in the form of a diblock copolymer. Very preferably there are either only poly-ether groups or only polyester groups present.

The radical $R^x$ is a linear alkylene radical having 2 to 4 carbon atoms or a branched alkylene radical having 3 or 4 carbon atoms.

Preferably $R^x$ is an ethylene, propylene, or butylene radical, more preferably an ethylene or propylene radical, and very preferably an ethylene radical.

In the (meth)acrylate of the structure (II), x adopts the values 0 to 100. Preferably x=0 to 25.

The radical $R^y$ is a linear alkylene radical having 2 to 6 carbon atoms or a branched alkylene radical having 3 to 6 carbon atoms, or a cyclic alkylene radical having 3 to 6 carbon atoms.

Preferably $R^y$ is a linear alkylene radical having 4 to 6, more preferably 5, carbon atoms.

In the (meth)acrylate of the structure (II), y adopts values from 0 to 100. Preferably y=2 to 15.

The radicals $R^x$ and $R^y$ are selected independently for each of the x (O—$R^x$) units and each of the y (O—CO—$R^y$) units. Preferably, the radicals $R^x$ are identical in all (O—$R^x$) units in a block of (O—$R^x$) units, and the radicals $R^y$ in all (O—CO—$R^y$) units are identical in a block of (O—CO—$R^y$) units.

Examples of hydroxyl-functional (meth)acrylates in accordance with the formula above are for example, but not exclusively, the compounds known under the trade names Placcel FA and Placcel FM from Daicel Chemical Industries, the compounds known under the trade names SR495B, SR399, SR444D, and SR604 from Sartomer, or the compounds available under the trade names Blemmer AE, AP, E, P, PE, PP or PEP from NOF Corporation.

$A^z$ is preferably an OH or an $NH_2$ group.

It is further preferred that z=1.

$R^z$ is an aliphatic or aromatic radical.

Preferably, for z=1, $R^z$ is an alkyl, an alkenyl, a halogenated alkyl, an aryl, an arylalkyl, an alkylaryl, a polyester, or a polyether radical.

More preferably, for z=1, $R^z$ is a halogenated alkyl radical having 1 to 30 carbon atoms, a linear alkyl radical having 1 to 30 carbon atoms, a branched or cyclic alkyl radical having 3 to 30 carbon atoms, a linear alkenyl radical having 2 to 30 carbon atoms, a branched alkenyl radical having 3 to 30 carbon atoms, or an aryl radical having 6 to 30 carbon atoms, or an alkylaryl radical or an arylalkyl radical having 7 to 30 carbon atoms.

Preferably, for z=1, $R^z$ is not fluorinated. More preferably, for z=1, $R^z$ is not halogenated.

It is likewise preferred for $R^z$ to be an aliphatic radical which contains ether groups and/or ester groups.

Examples of compounds of the structure (III) are butyl alcohol, oleyl alcohol, stearyl alcohol, benzylamine, stearylamine, oleylamine, hydroxyl-functional poly-ethers or polyesters, such as, for example, monomethylpolyethylene glycol, monobutylpolyethylene glycol, monoallylpolyethylene glycol, monopropenyl-polyethylene glycol, polyethylene glycol, polypropylene glycol, monoalkylpoly-ϵ-caprolactone, poly-ϵ-caprolactone.

Furthermore, m+n+x+y is ≥3.

Preferred, furthermore, is m+n+y≥6 and m+n+x+y≥10.

More preferably, 30≥m+n+x+y≥3. Very preferably 25≥m+n+x+y≥6.

Likewise preferred is 20≥m+n≥1 and 13≥x+y≥1 or 6≥x+y≥1.

It is additionally preferred for m=1 to 20 and n=0. Particularly preferred, moreover, is m=1 to 5 and n=0.

It is additionally preferred that x=1 to 13 and y=0 or x=0 and y=1 to 6. Also preferred, moreover, are x=0 and y=2 to 6.

All above-stated ranges for m and n and for x and y may be combined arbitrarily with one another.

Through the addition of the polyisocyanate adducts of the invention to coating materials, it is possible to obtain dirt-repellent, easy-to-clean, antiadhesive surfaces. It is the hydrophobic silicone fractions here which lead to the properties to be achieved, while the (O—$R^m$), (O—CO—$R^n$), (O—$R^x$), and (O—CO—$R^y$) units contribute to the compatibility, although the fraction of the hydrophobic groups is predominant in achieving a dirt repellence effect. Preferred, accordingly, is m+n+x+y<s. Particularly preferred is m+n+x+y<½·s.

It is further preferred for the NCO groups of the at least one polyisocyanate to be reacted completely. The reaction of the stated NCO groups may be determined from the NCO content of the polyisocyanate adducts of the invention. A complete reaction in the sense of the present specification means an NCO content of less than 5 wt %, preferably less than 3 wt %, more preferably less than 2 wt %, and very preferably less than 1 wt %.

The molar ratios referred to below are all based on the corresponding ratios of the reactants to be employed.

The respective components are employed with the proviso that the molar ratio of the at least one polysiloxane of the structure (I) and of the at least one (meth)acrylate of the structure (II), based on the NCO groups comprising in the at least one polyisocyanate, is for example 0.7 to 1.2, preferably 0.8 to 1.15, more preferably 0.9 to 1.1, and very preferably 0.95 to 1.05. Moreover, the molar ratio of the one or more isocyanate-reactive compound of the structure (III), based on the NCO groups comprising in the at least one polyisocyanate, is for example 0 to 0.6, preferably 0 to 0.3, more preferably 0 to 0.1, and very preferably 0 to 0.05.

It is preferred that no isocyanate-reactive compounds of the structure (III) are used.

The polysiloxane of the structure (I) and the (meth)acrylate of the structure (II) are employed with the proviso that the molar ratio between the at least one polysiloxane of the structure (I) and the at least one (meth)acrylate of the structure (II)

is for example between 0.01 and 0.6, preferably between 0.05 and 0.5, more preferably between 0.1 and 0.4, and very preferably between 0.15 and 0.3.

Where a reaction with two or more isocyanate-reactive compounds of the structure (III) takes place, the amount-of-substance fraction of such isocyanate-reactive compounds of the structure (III) for which z=2 is preferably less than 10%, more preferably less than 5%, and very preferably less than 1%, based on the total amount of substance of the isocyanate-reactive compounds of the structure (III).

It is likewise preferred that only those isocyanate-reactive compounds of the structure (III) for which z=1 are used.

The polyisocyanate adducts of the invention possess a solubility in tetrahydrofuran of, for example, at least 5 g/l, preferably at least 10 g/l, more preferably at least 20 g/l, and very preferably at least 30 g/l, in each case at 20° C.

A typical, very particularly preferred embodiment of the polyisocyanate adducts of the invention possesses, for example, the following features:

With regard to the structure (I), t=3 and s=4 to 200.

For all of radicals $R^a$, $R^b$, $R^c$, $R^d$ and $R^e$, the radical in each case is a methyl radical.

The polysiloxane of the structure (I) is composed exclusively of (O—$R^m$) units. In this case, all radicals $R^m$ are exclusively ethylene groups, or else all radicals $R^m$ are either an ethylene radical or a propylene radical. In both cases, m=1 to 20 and n=0.

$A^{Si}$ is an OH group.

The $R^a[SiR^bR^cO]SiR^dR^e$ radical of the polysiloxane of the structure (I) possesses a weight-average molecular weight in the range from 500 to 5000 g/mol.

The polyisocyanate is preferably an isocyanurate having three NCO groups.

Preference is given to using precisely one or precisely two (meth)acrylates of the structure (II). If precisely one (meth)acrylate of the structure (II) is used, then i=1. If two (meth)acrylates of the structure (II) are used, then for one of the said (meth)acrylates i=1 and for the other i=3, with the fraction of the (meth)acrylate of the structure (II) with i=3 being in the range from 20 to 30 mol %, based in each case on the total amount of substance of the (meth)acrylate of the structure (II) with i=1 and of the (meth)acrylate of the structure (II) with i=3.

For i=1, $R^U$ is preferably an ethylene radical.

For i=3, $(U—O)_i—R^U$ is preferably a corresponding pentaerythritol radical.

The structure (II) possesses either only (O—$R^x$) units, in which case x=1 to 13, or exclusively (O—$COR^y$) units, in which case y=1 to 6.

For all radicals $R^x$, the radical is an ethylene radical.

For all radicals $R^y$, the radical is a pentamethylene radical.

There is no further reaction with an isocyanate-reactive compound of the structure (III).

All of the isocyanate groups of the polyisocyanate are reacted.

The molar ratio between the at least one polysiloxane and the at least one (meth)acrylate is selected such that it is between 0.15 and 0.3.

Preferably in each case only one polysiloxane of the structure (I), one isocyanurate having three NCO groups, and one (meth)acrylate of the structure (II) is used.

The polyisocyanate adducts of the invention possess a weight-average molecular weight in the range from 500 to 60 000 g/mol.

The polyisocyanate adducts of the invention, obtainable by reaction of i. at least one polysiloxane which possesses the structure (I),
ii. at least one polyisocyanate having at least three NCO groups,
iii. at least one (meth)acrylate which possesses the structure (II),
iv. and optionally one or more isocyanate-reactive compounds of the structure (III), may be prepared, for example, by combining all of the components at once, and subsequent reaction. It is likewise possible for two components to be combined with one another and reacted with one another. This can then be followed by the reaction with further components.

In this context, in principle, all conceivable sequences are possible. With preference, first all the (meth)acrylate is reacted with the polyisocyanate, followed by the reaction with the polysiloxane and, where appropriate, with the isocyanate-reactive compound of the structure (III). It is further preferred for in each case only one polysiloxane of the structure (I), one polyisocyanate having at least three NCO groups, and optionally one isocyanate-reactive compound of the structure (III) to be used. Also preferably in each case one (meth)acrylate of the structure (II) with i=1 and optionally one further (meth)acrylate of the structure (II) with i>1 is used.

Generally speaking, on the basis of a reaction as shown above, the product is a mixture of polyisocyanate adducts. The resulting polyisocyanate adducts show a statistical distribution in terms of their frequency in the resultant mixture. This distribution can be influenced, for example, by the amount-of-substance ratio of the respective components. Also with a part to play is the sequence in which the individual components are reacted with one another. A further influence on the composition of the resultant mixture comes from the possibility of using one or more compounds of a particular component, in other words, for example, two or more different polysiloxanes of the structure (I).

It is also conceivable for specifically one particular polyisocyanate adduct to be prepared. This is illustrated below, taking the example of the reaction of an isocyanurate having three NCO groups with one polysiloxane of the structure (I) and one (meth)acrylate of the structure (II). First of all, one equivalent of a polysiloxane of the structure (I) is added dropwise to an excess of the isocyanurate having three NCO groups. This produces an adduct of a corresponding isocyanurate with precisely one polysiloxane of the structure (I). The excess isocyanurate is removed. The remaining NCO groups can then be reacted with a (meth)acrylate of the structure (II). The product is therefore an isocyanurate in which one NCO group has been reacted with a polysiloxane of the structure (I), and the other two NCO groups have each been reacted with a (meth)acrylate of the structure (II).

Through a corresponding reaction regime it is therefore possible in principle to synthesize individual polyisocyanate adducts specifically.

The preparation of the polyisocyanate adducts of the invention takes place optionally in the presence of one or optionally more catalysts, preferably at 0° C. to 100° C., more preferably at about 20° C. to 85° C.

Catalysts suitable for preparing the polyisocyanate adducts are, for example, tertiary amines, such as triethylamine, triethylenediamine, N-methylpyridine, and N-methylmorpholine, metal salts, such as tin octoate, lead octoate, and zinc stearate, and organometallic compounds, such as dibutyltin dilaurate.

The polyisocyanate adducts of the invention are prepared optionally in the presence of a radical polymerization inhibitor. Examples of radical polymerization inhibitors include hydroquinone, hydroquinone monomethyl ether, 4-hydroxy-2,2,6,6-tetra-methyl-1-piperidinyloxy (4-hydroxy-TEMPO), or phenothiazines. The radical polymerization inhibitor is used in order to scavenge free radicals which possibly form during the thermally supported formation of urethane or during storage of the macromonomers, thereby ensuring the stability of the (meth)acrylate. An advantage when using a radical polymerization inhibitor is therefore that the reaction regime is made easier and fewer by-products such as homooligomers or homopolymers are obtained.

Solvents may be used. However, they must not affect the formation of the isocyanate adducts. Suitable solvents are, for example, those which contain no active hydrogen atoms that might react with the isocyanate group.

Active hydrogen refers to the so-called active hydrogen of carboxyl, hydroxyl, amino and imino, and also thiol groups that is bonded to N, O, or S. The active hydrogen may be determined in accordance with a method developed by Tschugaeff and Zerewitinoff, by reaction with methylmagnesium bromide in butyl ether or other ethers (cf.: Römpp Chemie Lexikon, Georg Thieme Verlag, Germany, 1998, "Active hydrogen" page 81).

Solvents used are preferably aliphatic, cycloaliphatic, and aromatic solvents, ketones, and cyclic ethers. The choice of solvent is also guided by the subsequent end use of the polyisocyanate adduct of the invention to be synthesized subsequently from the macromonomers. Preferred solvents used are those having a boiling point<150° C., more preferably <100° C., in order to facilitate distillative removal.

At the end of the reaction, the product is cooled. As and when required, solvents and polymerization inhibitors may be removed before the subsequent radical copolymerization, by means of suitable distillation or filtration measures.

The weight-average molecular weight of the polyisocyanate adducts of the invention is preferably in the range from 500 to 60 000 g/mol, more preferably from 1000 to 30 000 g/mol, and very preferably from 3000 to 20 000 g/mol. The weight-average molecular weight of the polyisocyanate adducts is determined by means of gel permeation chromatography with tetrahydrofuran as eluent, and using polystyrene standards. The column material consists of styrene-divinylbenzene copolymers.

One possibility for the preparation of linear, monofunctional polysiloxanes is the equilibration of cyclic and open-chain polydialkylsiloxanes with terminally difunctional polysiloxanes, such as, for example, terminal—SiH or —NH$_2$ difunctional polydialkylsiloxanes, or with what are called functional blockers, as described in Noll (Chemie and Technologie der Silicone, VCH, Weinhelm, 1984) and Yig ör, I. and McGrath, J. E. (*Polysiloxane Containing Copolymers: A Survey of Recent Development; Advances in Polymer Science*; Springer-Verlag: New York, 1988; Vol. 86). For statistical reasons, the reaction product consists of a mixture of cyclic, difunctional, monofunctional, and nonfunctional polysiloxanes. The fraction of linear polysiloxanes in the reaction mixture can be increased by distillative removal of the lower cyclic species. Within the linear polysiloxanes, the fraction of monofunctional polysiloxanes in the equilibration reaction product ought to be as high as possible. Depending on the ratio of the reactants during the synthesis of the polymers of the invention, difunctional polysiloxanes may lead to crosslinking, and, depending on application, nonfunctional polysiloxanes may lead to instances of hazing and incompatibility.

In the context of the present invention, strictly mono-SiH-functional polysiloxanes are used, in other words those having only one Si—H group. The synthesis of these linear monofunctional polysiloxanes may be accomplished, for example, via a living anionic polymerization of cyclic polysiloxanes—hexamethylene-cyclotrisiloxane, for example. This method is described in references including T. Suzuki, Polymer, 30 (1989) 333. The reaction is shown by way of example in the following reaction scheme:

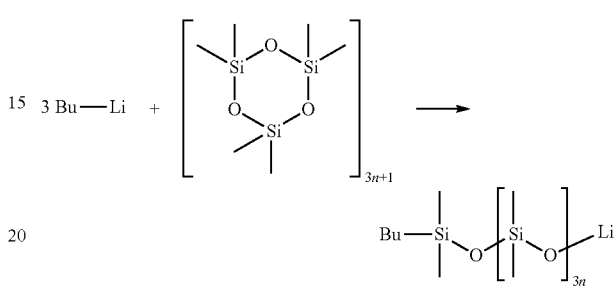

The SiHMe$_2$ functionalization of the end group may be accomplished using functional chlorosilanes, dimethyl-chlorosilane, for example, in analogy to the following reaction scheme, in accordance with the method known to a person of ordinary skill in the art.

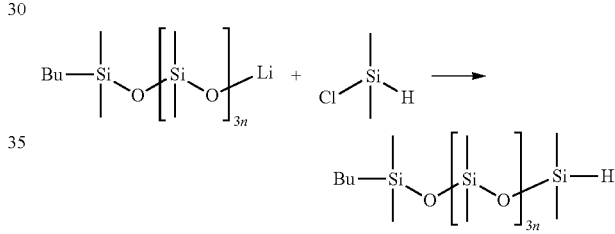

The mono-SiH-functional polysiloxanes are reacted in a hydrosilylation reaction with a (terminal) ethylenically unsaturated hydroxy compound, such as allylic or vinylic hydroxy compounds, to give mono-hydroxy-functional modified polysiloxanes. The hydrosilylation may be carried out in a manner known to the skilled person. This is described below, for a hydroxy-functional allyl polyether as an example.

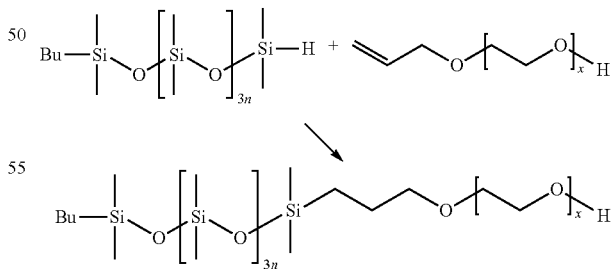

The hydrosilylation is carried out typically in the presence of a catalyst, such as, for example, of a platinum, rhodium, ruthenium, or palladium complex or of similar compounds, and/or of the corresponding pure elements, or of derivatives thereof immobilized on silica, alumina, or activated carbon, or similar support materials. The hydrosilylation is carried out preferably in the presence of Pt catalyst such as cisplatin, Speyers catalyst or Karstedt catalyst. The reaction is optionally buffered, in order to prevent secondary reactions with the hydroxyl group. Because of the possible allyl-propenyl rearrangement during the reaction, an excess of the allyl polyether in comparison to the SiH-functional polysiloxane is optionally employed.

The amount of catalyst used is preferably $10^{-7}$ to $10^{-1}$ mol per mole of olefin or per mole of terminal carbon-carbon double bond, preferably 1 to 100 ppm based on the amount of substance of the component with terminal carbon-carbon double bonding. The hydrosilylation is carried out preferably at temperatures of 0 and 200° C., preferably of 20 to 120° C.

The hydrosilylation may be carried out in the presence or in the absence of solvents. Suitable solvents are, for example, aliphatic or aromatic hydrocarbons, cyclic oligosiloxanes, aliphatic or cyclic ethers or alcohols. Especially suitable are cyclohexane, xylene, or toluene.

The course of the reaction may be monitored by gas-volumetric determination of the remaining SiH groups or by infrared spectroscopy (absorption band of silicon hydride at 2150 $cm^{-1}$).

The invention further provides a process for preparing polyisocyanate adducts by reaction of i. at least one polysiloxane which possesses the structure (I) below

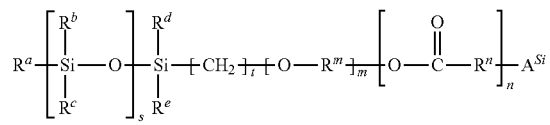

where t=2 to 30, m=0 to 100, n=0 to 100, s=1 to 400, $R^a$ is a halogenated alkyl radical having 1 to 30 carbon atoms, a linear alkyl radical having 1 to 30 carbon atoms, a branched or cyclic alkyl radical having 3 to 30 carbon atoms, or an aryl radical having 6 to 30 carbon atoms, or an alkylaryl radical or arylalkyl radical having 7 to 30 carbon atoms, all of $R^b$, $R^c$, $R^d$ and $R^e$ independently of one another are linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms, $R^d$ and $R^e$, moreover, independently of one another may be $R^a[SiR^bR^cO]_s$, where $R^a$, $R^b$, $R^c$, and s are as defined above and are selected independently therefrom, the m (O—$R^m$) units and the n (O—CO—$R^n$) units in the structural unit $[O—R^m]_m—[O—CO—R^n]_n$ are arranged in any order, $R^m$ is a linear alkylene radical having 2 to 4 carbon atoms or a branched alkylene radical having 3 or 4 carbon atoms, $R^n$ is a linear alkylene radical having 2 to 6 carbon atoms or a branched alkylene radical having 3 to 6 carbon atoms, or a cyclic alkylene radical having 3 to 6 carbon atoms, the radicals $R^m$ and $R^n$ are selected independently for each of the m (O—$R^m$) units and each of the n (O—CO—$R^n$) units, and $A^{Si}$ is an OH, $NH_2$, or $CO_2H$ group;

ii. at least one polyisocyanate having at least three NCO groups;

iii. at least one (meth)acrylate which possesses the structure (II) below:

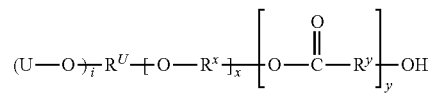

where x=0 to 100, y=0 to 100,
U is one of the following groups:

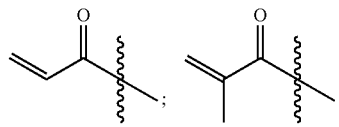

$R^U$ is a (i+1)-valent organic radical with i=1 to 5, the x (O—$R^x$) units and the y (O—CO—$R^y$) units in the structural unit $[O—R^x]_x—[O—CO—R^y]_y$ are arranged in any order, $R^x$ is a linear alkylene radical having 2 to 4 carbon atoms or a branched alkylene radical having 3 or 4 carbon atoms, $R^y$ is a linear alkylene radical having 2 to 6 carbon atoms or a branched alkylene radical having 3 to 6 carbon atoms, or a cyclic alkylene radical having 3 to 6 carbon atoms, the radicals $R^x$ and $R^y$ are selected independently for each of the x (O—$R^x$) units and each of the y (O—CO—$R^y$) units; and iv. optionally one or more isocyanate-reactive compounds of the structure (III), which is different from the components used under i to iii:

$R^z$-$(A^z)_z$; with z=1 or 2 where $R^z$ is an aliphatic or aromatic radical, and $A^z$ is an OH, $NH_2$, or $CO_2H$ group, and m+n+x+y≥3.

All features disclosed above in relation to the polyisocyanate adducts relate likewise to the above process. This is especially true of all of the stated preferred features as well.

The invention further provides for the use of 0.005 to 10 wt % of the polyisocyanate adducts of the invention as additive in radiation-curable coating material compositions, the weight percentage figure being based on the overall formulation of the radiation-curable coating material composition.

The polyisocyanate adducts of the invention may be used, for example, as leveling agents in coating materials, in order to improve the optical properties of the resulting coating, for example. Through the use of the polyisocyanate adducts of the invention as leveling agents, it is also possible, for example, to improve the gloss and/or the opalescence of the coating materials and/or coatings. The use of the polyisocyanate adducts of the invention leads likewise to a reduction in cratering and also to an improvement in the slip properties of the resultant coating. Moreover, the polyisocyanate adducts of the invention are used for preventing instances of hazing.

By adding the polyisocyanate adducts of the invention to coating materials it is possible to obtain dirt-repellent, easy-to-clean, antiadhesive surfaces. In the polyisocyanate adducts of the invention, the hydrophobic silicone fractions lead to the properties to be achieved, while the (O—$R^m$), (O—CO—$R^n$), (O—$R^x$), and (O—CO—$R^y$) units contribute to compatibility in the coating material composition, although the fraction of the hydrophobic groups is predominant for achieving a dirt repellence effect.

Through the isocyanate-reactive compound of the structure (III) it is possible, through an appropriate choice of the radical $R^z$, to introduce further hydrophobic groups. This also leads customarily to a drastic reduction in the surface energy and hence likewise influences the dirt repellence effect of the resulting surface.

The compatibility in terms of the coating material composition may likewise be influenced by radicals $R^z$ for which the radical in question is an aliphatic radical which contains ether groups and/or ester groups.

Coating compositions to which the polyisocyanate adducts of the invention are added have excellent antiadhesive and dirt repellence properties. Such coating material compositions are preferably compositions for producing antigraffiti coatings, release coatings, self-cleaning façade coatings, ice-repellent coatings, for aircraft for example, automobile tire coatings, dirt-repellent machine coatings or instrument coatings, marine coatings (antifouling coatings), and dirt-repellent furniture coatings and release paper coatings. Owing to the unusually good antiadhesive effect of the coating material compositions of the present invention, even oily substances, such as mineral oils, vegetable oils, or oily preparations, for example, can be repelled, meaning that containers coated accordingly can be emptied completely of these fluids. Consequently, the coating material compositions provided accordingly with the polyisocyanate adducts of the invention are suitable for coating can interiors or for coating container interiors. Furthermore, in view of the extraordinarily broad compatibility of the polyisocyanate adducts of the invention, it is also suitable for producing transparent coating materials.

The polyisocyanate adducts of the invention do not adversely affect the other properties, such as weather resistance or mechanical resistance, for example, of the coating materials or coatings. The polyisocyanate adducts of the invention can be added to the coating materials preferably even in relatively low amounts of 0.01 to 5 wt %, more preferably of 0.02 to 2 wt %, and very preferably of 0.03 to 1 wt %, in each case based on the overall composition of the coating material.

The physical properties of the original coating materials and coatings, in respect of corrosion prevention, gloss retention, and weathering resistance, for example, are unaffected by the low concentrations of the polyisocyanate adducts of the invention. Coating materials and coatings comprising the polyisocyanate adducts of the invention exhibit the desired properties in general also over a period of several years, and retain these properties even over a number of cleaning cycles.

The polyisocyanate adducts of the invention comprise (meth)acrylate groups and are able to react with corresponding α,β-ethylenically unsaturated groups in the binder. Accordingly, permanent embedding into the resulting coating, and hence a durable effect, is ensured by the polyisocyanate adducts of the invention.

Additionally provided by the present invention, therefore, is a radiation-curable coating material composition which comprises
(a) at least one radiation-curable polymer as binder, and
(b) at least one polyisocyanate adduct of the invention.

Unless indicated otherwise, the weight percentage figures given below are based on the overall formulation of the radiation-curable coating material composition.

The polyisocyanates of the invention are generally obtained, in their preparation, as a mixture. The resulting mixture of polyisocyanate adducts is preferably used directly in a corresponding, radiation-curable coating material composition.

Radiation curing refers to a process in which a chemical reaction proceeds in dependence on the wavelength or the electron energy absorbed. For such processes, electron beams or UV rays are used. For further details, refer to Römpp Lexikon Lacke and Druckfarben, Georg Thieme Verlag, Stuttgart, New York, 1998, "Radiation curing", pages 543 and 544.

The first constituent of the coating material composition of the invention is a radiation-curing polymer as binder. Polymers are mixtures of different-sized molecules, these molecules being distinguished by a sequence of identical or different organic monomer units (as the reacted form of organic monomers). While a defined organic monomer can be assigned a discrete molecular mass, then, a polymer is always a mixture of molecules, which differ in their molecular mass. A polymer, therefore, cannot be described by a discrete molecular mass, but is instead always assigned average molecular masses, namely a number-average ($M_n$) and a weight-average ($M_w$) molecular mass. As is known, the properties described must by definition always lead to the relationship of $M_w$ being greater than $M_n$; the polydispersity ($M_w/M_n$) is always greater than 1. The resins in question are therefore, for example, the polyaddition resins, polycondensation resins and/or polymerization resins that are known per se.

As radiation-curable polymer it is possible to use (meth)acryloyl-functional (meth)acrylate copolymers, polyether acrylates, polyester acrylates, unsaturated polyesters, epoxy acrylates, urethane acrylates, amino acrylates, melamine acrylates, and the corresponding methacrylates. Preference is given to using urethane (meth)acrylates and polyester (meth)acrylate resins. The radiation-curable polymer is used preferably in amounts of 30 to 99 wt %, more preferably of 30 to 90 wt %, and very preferably of 45 to 80 wt %.

The at least one polyisocyanate adduct of the invention is used for example in amounts of 0.005 to 10 wt %, preferably 0.01 to 5 wt %, more preferably of 0.02 to 2 wt %, and very preferably of 0.03 to 1 wt %.

The radiation-curable coating material composition may further comprise at least one reactive diluent.

In accordance with DIN 55945, the term "reactive diluent" or "reactive solvent" identifies all those solvents which in the course of curing largely become part of the coating by chemical reaction. At this point, reference may also be made to Römpp Lexikon Lacke and Druckfarben, Georg Thieme Verlag, Stuttgart, New York, 1998, "Reactive diluents", pages 491 and 492. In the present case, radiation-curable reactive diluents are to be used. Such radiation-curable reactive diluents include, in particular, acrylate, methacrylate and/or vinyl groups. Examples of such reactive diluents that are known to the skilled person include the following: butyl acrylate, 2-ethylhexyl acrylate, lauryl acrylate, n-hexyl acrylate, 2-phenoxy-ethyl acrylate, isobornyl acrylate, dipropylene glycol diacrylate, tripropylene glycol diacrylate, 1,6-hexanediol diacrylate, pentaerythritol tri- or tetraacrylate, trimethylolpropane-O,O',O"-triethanol triacrylate, trimethylolpropane triacrylate, ethyl triglycol methacrylate, furfuryl methacrylate, 2-hydroxyethyl methacrylate, 2-hydroxypropyl methacrylate, lauryl methacrylate, tetrahydrofurfuryl methacrylate, allyl methacrylate, 1,3-butanediol dimethacrylate, 1,4-butanediol dimethacrylate, diethylene glycol dimethacrylate, glycidyl methacrylate, 1,6-hexanediol dimethacrylate, triethylene glycol dimethacrylate, trimethylolpropane trimethacrylate, ethyl diglycol acrylate, 4-tert-butylcyclohexyl acrylate, N-vinyl-caprolactam, N-vinylpyrrolidone, vinyl propionate, bisphenol A dimethacrylate, Dianol diacrylate, 1,12-dodecanediol dimethacrylate, N,N'-divinyl-N,N'-ethyleneurea, ethylene glycol dimethacrylate, octadecyl diacrylate, polyethylene glycol-n dimethacrylate, dihydrodicyclopentadienyl acrylate, ethyl vinyl ether, n-propyl vinyl ether, isopropyl vinyl ether, n-butyl vinyl ether, isobutyl vinyl ether, octadecyl vinyl ether, cyclohexyl vinyl ether, 1,4-butanediol divinyl ether, 1,4-butanediol monovinyl ether, 1,4-cyclohexane-dimethanol divinyl ether, 1,4-cyclohexane-dimethanol monovinyl ether, diethylene glycol divinyl ether, triethylene glycol divinyl ether.

It is also possible to use reactive diluents which as well as a reactive double bond carry one or more other reactive groups. Examples of such reactive diluents that are known to the skilled person include the following: allyl glycidyl ether, diallyl phthalate, polyol monohydroxytriacrylate, 2-hydroxyethyl acrylate, 2-hydroxypropyl acrylate, 2-hydroxyethyl acrylate phosphate, 2-hydroxyethyl methacrylate phosphate, diurethane dimethacrylate, 2-(tert-butylamino)ethyl methacrylate, N-(isobutoxymethyl)acrylamide.

The at least one radiation-curable reactive diluent is used in amounts of 0 to 65 wt %, preferably 20 to 62 wt %, more preferably of 35 to 60 wt %, and very preferably of 40 to 55 wt %.

The radiation-curable coating material composition optionally comprises an organic or inorganic solvent which does not radiation-cure. Water, for example, can be used as inorganic solvent. Organic solvents are used with preference. Organic solvents employed are the typical organic solvents known to the skilled person, examples being aliphatic, cycloaliphatic, and aromatic solvents, typical alcohols, ethers, esters and/or ketones such as, for example, ethanol, isopropanol, butanol, butyl glycol, butyl diglycol, butyl acetate, methyl isobutyl ketone, methyl ethyl ketone, xylene, toluene, Shellsol A, Solvesso products.

The radiation-curable coating material composition may likewise be solvent-based. A coating material composition is considered to be solvent-based for the purposes of the present invention if it contains not more than 10 wt %, preferably not more than 5 wt %, especially preferably not more than 2 wt %, of water, based on the total amount of solvents.

The radiation-curable coating material composition may further comprise one or more photoinitiators.

Photoinitiators are additives in radiation-curable systems that by virtue of absorption of ultraviolet or visible radiation form reactive intermediates which are able to initiate a polymerization reaction. At this point reference may also be made to Römpp Lexikon Lacke and Druckfarben, Georg Thieme Verlag, Stuttgart, New York, 1998, "Photoinitiators" pages 444 to 446.

Examples of photoinitiators that are known to the skilled person include the following: 2,2-dimethoxy-1,2-diphenylethanone, (1-hydroxycyclohexyl)phenyl-methanone, 2-hydroxy-2-methyl-1-phenyl-1-propanone, 2-hydroxy-1-[4-(2-hydroxyethoxy)phenyl]-2-methyl-1-propanone, 2-benzyl-2-dimethylamino-1-(4-morpholino-phenyl)-1-butanone, 2-methyl-1-[4-(methylthio)phenyl]-2-morpholino-1-propanone, α,α-diethoxyacetophenone, diphenyl(2,4,6-trimethylbenzoyl)phosphine oxide, bis(2,6-dimethoxybenzoyl)(2,4,4-trimethylpentyl)-phosphine oxide, 1-phenyl-1,2-propanedione-2-[O -(ethoxycarbonyl)oxime], bis($\eta^5$-cyclopentadienyl)bis[2,6-difluoro-3-(1H-1-pyrrol-1-yl) phenyl]titanium, 2-isopropylthioxanthone, 1,2-diphenyl-2-(p-tolyl-sulfonyloxy)ethanone.

Where one or more photoinitiators are included, they are used in a total amount of 0.5 to 5 wt %, preferably 1 to 4.5 wt %, and very preferably 2 to 4 wt %.

The coating material composition of the invention may further comprise at least one UV absorber. The term "UV absorbers" refers to a class of light stabilizers which are added to coating materials or plastics in order to protect against the damaging effect of UV light in the range from 290 to 400 nm. The most important classes of UV absorber are 2-(2-hydroxyphenyl)-2H-benzotriazoles, (2-hydroxyphenyl)-s-triazines, hydroxybenzophenones, and oxalanilides. At this point reference may also be made to Römpp-Lexikon Lacke und Druckfarben Georg Thieme Verlag, Stuttgart, New York, 1998, "UV absorbers", pages 593 and 594.

Furthermore, the radiation-curable coating material composition to be employed in the context of the present use may additionally comprise pigments or fillers. The selection of such pigments or fillers may be selected by the skilled person in accordance with the requirements of the individual case. For further details, reference may be made, for example, to Römpp-Lexikon "Lacke und Druckfarben", Georg Thieme Verlag, Stuttgart, New York, 1998, pages 250 to 252 and also 451 to 453.

The radiation-curable coating material composition may further comprise deaerating agents, defoamers, emulsifiers, wetting and dispersing agents, adhesion promoters, film-forming assistants, rheology control additives (thickeners), flame retardants, siccatives, driers, antiskinning agents, corrosion inhibitors, waxes, matting agents, and other adjuvants known to the skilled person. Such additives may be selected by the skilled person in accordance with the requirements of the individual case, on the basis of his or her art knowledge, and may be employed in the customary and known, effective amounts.

The invention is elucidated in more detail below, using specific examples. First of all, for this purpose, the measuring methods used will be described.

Measuring Methods:
Weight-Average Molecular Weight ($M_w$)

The $M_w$ was determined by means of gel permeation chromatography with tetrahydrofuran as eluent and using polystyrene standards. The column material consists of styrene-divinylbenzene copolymers.

Determination of NCO Content

The NCO content is determined quantitatively by reaction of the NCO groups (isocyanates) with an excess of dibutylamine to form urea derivatives, and subsequent back-titration of the excess amine with HCl. The NCO content indicates the isocyanate content in wt %.

Determination of Hydroxyl Number

Alcoholic hydroxyl groups are reacted by acetylation with excess of acetic anhydride. The excess acetic anhydride is subsequently cleaved in acetic acid by addition of water, and the entire acetic acid is back-titrated with ethanolic KOH. The OH number indicates the amount of KOH in mg which is equivalent to the amount of acetic acid bound in the acetylation of 1 g of substance.

Determination of Solids

Approximately 2 g of sample are weighed out into an aluminum dish which has been dried beforehand, and the sample is dried in a drying cabinet at 150° C. for 10 minutes, cooled in a desiccator, and then weighed again. The residue corresponds to the solids fraction.

SYNTHESIS EXAMPLES

Example 1

Monohydroxy-Functional, Polyether-Modified Polydimethylsiloxane

A four-neck flask equipped with stirrer, thermometer, dropping funnel, reflux condenser, and nitrogen inlet tube is charged with monoallyl-polyethylene glycol (147 g, Mn≈480 g/mol) and Karstedt catalyst (4 g, 0.2% dilution in xylene) and this initial charge is heated to 60° C. A mono-SiH-functional polydimethylsiloxane (500 g, Mn≈2000 g/mol) is metered in at a rate such that the temperature does not exceed 70° C. The conversion of the mono-SiH-functional polysiloxane is monitored by means of gas-volumetric determination. The hydroxyl number measured on the product is 28.1 mg KOH/g.

Example 2

Monohydroxy-Functional, Polyether-Modified Polydimethylsiloxane

A four-neck flask equipped with stirrer, thermometer, dropping funnel, reflux condenser, and nitrogen inlet tube is charged with monoallyl-polyethylene glycol-co-propylene glycol (149 g, Mn≈830 g/mol) and Karstedt catalyst (2 g, 0.2% dilution in xylene) and this initial charge is heated to 60° C. A mono-SiH-functional polydimethylsiloxane (300 g, Mn≈2000 g/mol) is metered in at a rate such that the temperature does not exceed 70° C. The conversion of the mono-SiH-functional polysiloxane is monitored by means of gas-volumetric determination. The hydroxyl number measured on the product is 24 mg KOH/g.

Example 3

Monohydroxy-Functional Polydimethylsiloxane

A four-neck flask equipped with stirrer, thermometer, dropping funnel, reflux condenser, and nitrogen inlet tube is charged with mono-SiH-functional polysiloxane (300 g, Mn≈2000 g/mol) and Karstedt catalyst (0.75 g, 0.2% dilution in xylene) and this initial charge is heated to 60° C. Monoallyl glycol (19.9 g) is metered in at a rate such that the temperature does not exceed 70° C. The conversion of the mono-SiH-functional polysiloxane is monitored by means of gas-volumetric determination. Following complete conversion, the excess allyl glycol is removed by distillation. The hydroxyl number measured on the product is 25.2 mg KOH/g.

Example 4

Dihydroxy-Functional Polydimethylsiloxane

A four-neck flask equipped with stirrer, thermometer, dropping funnel, reflux condenser, and nitrogen inlet tube is charged with di-SiH-functional polysiloxane (522 g, Mn≈2000 g/mol) and Karstedt catalyst (1.31 g, 0.2% dilution in xylene) and this initial charge is heated to 60° C. Monoallyl glycol (73.0 g) is metered in at a rate such that the temperature does not exceed 70° C. The conversion of the di-SiH-functional polysiloxane is monitored by means of gas-volumetric determination. Following complete conversion, the excess allyl glycol is removed by distillation. The hydroxyl number measured on the product is 53.3 mg KOH/g.

Example 5

Dihydroxy-Functional Polydimethylsiloxane

A four-neck flask equipped with stirrer, thermometer, dropping funnel, reflux condenser, and nitrogen inlet tube is charged with di-SiH-functional polysiloxane (300 g, Mn≈4000 g/mol) and Karstedt catalyst (0.75 g, 0.2% dilution in xylene) and this initial charge is heated to 60° C. Monoallyl glycol (17.4 g) is metered in at a rate such that the temperature does not exceed 70° C. The conversion of the di-SiH-functional polysiloxane is monitored by means of gas-volumetric determination. Following complete conversion, the excess allyl glycol is removed by distillation. The hydroxyl number measured on the product is 25.4 mg KOH/g.

General Synthesis Protocol for the Inventive Polyisocyanate Adducts and for the Comparative Example A four-neck flask equipped with dropping funnel, stirrer, thermometer, and condenser is charged with ethyl acetate (about 65%, based on the overall batch), Desmodur N3300, and a corresponding acrylate (cf. table 1), and this initial charge is heated to 60° C. Subsequently 0.02% of DBTL (di-n-butyltin dilaurate) is added. After 5 hours, the silicone is added. The solvent is removed by distillation and the additives are diluted to 40% in TPGDA (tripropylene glycol diacrylate).

In accordance with the general protocol, a series of polyisocyanate adducts was prepared:

TABLE 1

Preparation of the polyisocyanate adducts

| Example | Polysiloxane | Desmodur N3300 | Acrylate | $M_w$ |
|---|---|---|---|---|
| Example 6 | Example 1 103.6 g | 60 g | Tone M100 86.9 g | 6900 |
| Example 7 | Example 2 101.1 g | 50 g | Tone M100 72.4 g | 8000 |
| Example 8 | Example 2 120.8 g | 60 g | Blemmer AE200 85.1 | 7300 |
| Example 9 | Example 3 81 g | 40 g | Placcel FA5 118.8 g | 7800 |
| Example 10 | Example 3 101.5 g | 50 g | Blemmer AE400 94.8 g | 17 500 |
| Example 11 | Example 2 112.0 g | 60 g | Tone M100/ Sartomer SR444D 72.0 g/22.1 g | 7400 |
| Comparative example 1 | Example 4 43.1 g | 50 g | Tone M100 72.4 g | 12 900 |
| Comparative example 2 | Example 5 81.8 g | 40 g | Placcel FA5 117.2 g | 11 100 |
| Comparative example 3 | Example 4 69.0 g | 40 g | Placcel FA5 95.1 g | 18 700 |
| Comparative example 4 | Example 4 81.9 g | 50 g | Blemmer AE400 77.7 g | — |
| Comparative example 5 | Example 5 101.3 g | 50 g | Blemmer AE400 93.6 g | — |

Tone M100: $CH_2$=CH—C(O)—O—$C_2H_4$O—[C(O)—$C_5H_{10}$O]$_2$—H
Blemmer AE200: $CH_2$=CH—C(O)—O—[$C_2H_4$O]$_{4.5}$—H
Placcel FA5: $CH_2$=CH—C(O)—O—$C_2H_4$O—[C(O)—$C_5H_{10}$O]$_5$—H
Blemmer AE400: $CH_2$=CH—C(O)—O—[$C_2H_4$O]$_{10}$—H
Sartomer SR444D: HOCH$_2$—C—[CH$_2$—OC(O)—CH=CH$_2$]$_3$ Comparative examples 4 and 5 underwent crosslinking during synthesis. Determination of the weight-average molecular weight ($M_w$) was therefore not possible. Moreover, the resulting reaction products could not be used as additives.

Application Examples

Using the polyisocyanates adducts of inventive examples 6 to 11 and of comparative examples 1 to 3, coating compositions (see table 2) were produced. These coating compositions were used to produce coatings on glass plates. Various properties of the coatings were investigated. The properties investigated and also the associated analytical techniques are described below:

TABLE 2

Radiation-curing, reactive diluent-based coating system

| Constituent | Amount (in wt %, based on overall formulation) |
|---|---|
| Laromer PE 56 F | 50.2 |
| Laromer DPGDA | 45.8 |
| Irgacure 500 | 4 |

Laromer PE 56 F: unsaturated polyester acrylate resin Laromer DPGDA (dipropylene glycol diacrylate, acrylic ester as reactive diluent (BASF))
Irgacure 500: mixture of two photoinitiators (BASF)

The additives, 0.1%, and/or 0.3% of polyisocyanate adduct, based on the overall formulation, are subsequently incorporated using a dissolver (three minutes at 2000 rpm). One day following the incorporation, the additized coating materials are drawn down onto a glass plate, using a 25 μm four-way bar coater. After drawdown, the samples are cured in a UV unit with an Hg lamp (120 W/cm) at 5 m/min.

The formation of craters, the leveling, and the development of hazing in the coating material is assessed visually. (1=good, 5=poor).

For determining the COF-value (reduction in slip resistance), the metal panels post-application are subjected to measurement using the ALTEK Company instrument Altek-9505 AE. This involves a 1 kg weight being drawn over the metal panel at a speed of 127 mm/min. For calculation of the COF, the value obtained is multiplied by a factor of 0.01.

Edding Test:

The surface of the coating material is written on using an Edding 400 permanent marker, and a visual assessment is made of whether the surface is writable. The parameter assessed is whether the ink spreads on the surface or contracts. After the ink has dried, an attempt is made to wipe it off using a dry cloth.

Evaluation: 1-5
1=Ink contracts, can be removed without residue using a paper cloth
5=Ink spreads very well on the substrate, is virtually impossible to remove Mineral Oil Run Off Test:

A drop of commercial mineral oil is applied to the coating material surface. The coated surface is then tipped until the drop has run approximately 10 cm. After 5 minutes have elapsed, an inspection is made to evaluate the oil track or drop reformation.

Evaluation: 1-5:
1=The oil track immediately reforms into individual drops
5=The oil track does not reform, but instead spreads possibly wider

TABLE 3

Results for 0.3% addition of additive:

| Description | Craters | Leveling | Hazing | COF | Edding test | Oil run test |
|---|---|---|---|---|---|---|
| Blank sample | 1-2 | 1 | 1 | 0.68 | 5 | 5 |
| Inventive example 6 | 1 | 1 | 1 | 0.09 | 2 | 2 |
| Inventive example 7 | 1-2 | 1 | 1 | 0.09 | 2 | 1 |
| Inventive example 8 | 1 | 1-2 | 1 | 0.10 | 2 | 2 |
| Inventive example 9 | 1 | 1 | 1 | 0.08 | 2 | 2 |
| Inventive example 10 | 1-2 | 1 | 1 | 0.08 | 2 | 2 |
| Inventive example 11 | 1 | 1 | 1 | 0.10 | 2 | 2 |
| Comparative example 1 | 1-2 | 1-2 | 1 | 0.14 | 2 | 2 |
| Comparative example 2 | 1-2 | 1 | 1 | 0.12 | 2 | 2 |
| Comparative example 3 | 1 | 1-2 | 1 | 0.12 | 2 | 3 |
| Tegorad 2010 | 3 | 3-4 | 1 | 0.15 | 2 | 1 |

Tegorad 2010 is a commercial siloxane acrylate from Tego Chemie Service GmbH, which contains no urethane groups.

The blank sample is a radiation-curable coating system as per table 2 in which no additive has been used.

The results from table 3 show that the use of the inventive polyisocyanate adducts of inventive examples 6 to 11 as additives produces an improvement in the slip properties. At the same time, the outstanding properties such as low cratering, excellent leveling, relatively low hazing, and resistance to soiling, are retained or even improved.

TABLE 4

Results for 0.1% addition of additive:

| Description | Craters | Leveling | Hazing | COF |
|---|---|---|---|---|
| Blank sample | 1-2 | 1 | 1 | 0.68 |
| Inventive example 6 | 1 | 1 | 1 | 0.17 |
| Inventive example 7 | 2-3 | 2 | 1 | 0.25 |
| Inventive example 8 | 2 | 1 | 1 | 0.22 |
| Inventive example 9 | 1-2 | 1-2 | 1 | 0.18 |
| Inventive example 10 | 1-2 | 1-2 | 1 | 0.20 |
| Inventive example 11 | 1 | 1 | 1 | 0.18 |
| Comparative example 1 | 2-3 | 2 | 1 | 0.38 |
| Comparative example 2 | 1 | 1-2 | 1 | 0.30 |
| Comparative example 3 | 1-2 | 1 | 1 | 0.31 |

The results from table 4 show that the use of the inventive polyisocyanate adducts of inventive examples 6 to 11 as additives produces a particularly strong improvement in the slip properties, even at a low level of additive metering.

The invention claimed is:

1. A method for reducing cratering in a composition; improving the slip properties of a composition; for preventing hazing of a composition; or rendering a composition dirt-repellant, easy-to-clean or antiadhesive; comprising adding to a composition 0.01 to 5 wt% of the polyisocyanate adducts obtainable by reacting i. at least one polysiloxane which possesses the structure (I) below

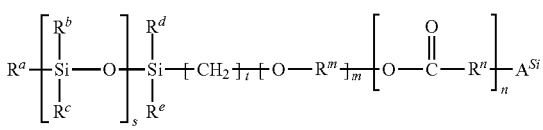

where $t = 2$ to $30$, $m = 0$ to $100$, $n = 0$ to $100$, $s = 1$ to $400$, $R^a$ is a halogenated alkyl radical having 1 to 30 carbon atoms, a linear alkyl radical having 1 to 30 carbon atoms, a branched or cyclic alkyl radical having 3 to 30 carbon atoms, or an aryl radical having 6 to 30 carbon atoms, or an alkylaryl radical or arylalkyl radical having 7 to 30 carbon atoms, all of $R^b$, $R^c$, $R^d$ and $R^e$ independently of one another are linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms, $R^d$ and $R^e$, moreover, independently of one another may be $R^a[SiR^bR^c O]_s$, where $R^a$, $R^b$, $R^c$, and s are as defined above and are selected independently therefrom, the m (O—$R^m$) units and the n (O—CO—$R^n$) units in the structural unit $[O-R^m]_m-[O-CO-R^n]_n$ are arranged in any order, $R^m$ is a linear alkylene radical having 2 to 4 carbon atoms or a branched alkylene radical having 3 or 4 carbon atoms, $R^n$ is a linear alkylene radical having 2 to 6 carbon atoms or a branched alkylene radical having 3 to 6 carbon atoms, or a cyclic alkylene radical having 3 to 6 carbon atoms, the radicals $R^m$ and $R^n$ are selected independently for each of the m (O—$R^m$) units and each of the n (O—CO—$R^n$) units, and $A^{si}$ is an OH, $NH_2$, or $CO_2H$ group;

ii. at least one polyisocyanate having at least three NCO groups;

iii. at least one (meth)acrylate which possesses the structure (II) below:

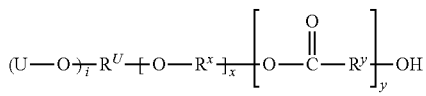

where x =0 to 100, y =0 to 100,
U is one of the following groups:

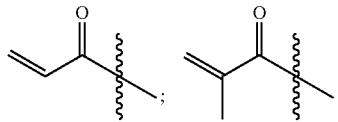

$R^U$ is a (i+1)-valent organic radical with i =1 to 5,
the x (O—$R^x$) units and the y (O—CO—$R^y$) units in the structural unit $[O-R^x]_x-[O-CO-R^y]_y$ are arranged in any order, $R^x$ is a linear alkylene radical having 2 to 4 carbon atoms or a branched alkylene radical having 3 or 4 carbon atoms, $R^y$ is a linear alkylene radical having 2 to 6 carbon atoms or a branched alkylene radical having 3 to 6 carbon atoms, or a cyclic alkylene radical having 3 to 6 carbon atoms, the radicals $R^x$ and $R^y$ are selected independently for each of the x (O—$R^x$) units and each of the y (O—CO—$R^y$) units; and iv. optionally one or more isocyanate-reactive compounds of the structure (III), which is different from the components used under i to iii:

$R^z$-$(A^z)_z$; with z =1 or 2
where $R^z$ is an aliphatic or aromatic radical, and $A^z$ is an OH, $NH_2$, or $CO_2H$ group,
and m+n+x+y≥3,
wherein the composition is a radiation-curable coating material composition and the weight-percentage figure is based on the overall formulation of the radiation-curable coating material composition.

2. A radiation-curable coating material composition comprising
(a) at least one radiation-curable polymer as binder and
(b) at least one polyisocyanate adduct obtainable by reacting
i. at least one polysiloxane which possesses the structure (I) below

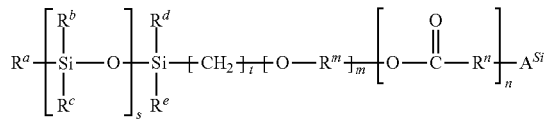

where t =2 to 30, m =0 to 100, n =0 to 100, s =1 to 400, $R^a$ is a halogenated alkyl radical having 1 to 30 carbon atoms, a linear alkyl radical having 1 to 30 carbon atoms, a branched or cyclic alkyl radical having 3 to 30 carbon atoms, or an aryl radical having 6 to 30 carbon atoms, or an alkylaryl radical or arylalkyl radical having 7 to 30 carbon atoms, all of $R^b$, $R^c$, $R^d$ and $R^e$ independently of one another are linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms, $R^d$ and $R^e$, moreover, independently of one another may be $R^a[SiR^bR^cO]_s$ where $R^a$, $R^b$, $R^c$, and s are as defined above and are selected independently therefrom, the m (O—$R^m$) units and the n (O—CO—$R^n$) units in the structural unit $[O-R^m]_m-[O-CO-R^n]_n$ are arranged in any order, $R^m$ is a linear alkylene radical having 2 to 4 carbon atoms or a branched alkylene radical having 3 or 4 carbon atoms, $R^n$ is a linear alkylene radical having 2 to 6 carbon atoms or a branched alkylene radical having 3 to 6 carbon atoms, or a cyclic alkylene radical having 3 to 6 carbon atoms, the radicals $R^m$ and $R^n$ are selected independently for each of the m (O—$R^m$) units and each of the n (O—CO—$R^n$) units, and $A^{Si}$ is an OH, $NH_2$, or $CO_2H$ group;

ii. at least one polyisocyanate having at least three NCO groups;

iii. at least one (meth)acrylate which possesses the structure (II) below:

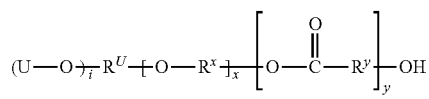

where x =0 to 100, y =0 to 100,
U is one of the following groups:

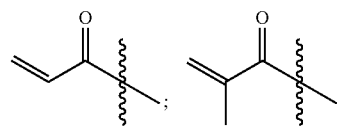

$R^U$ is a (i+1)-valent organic radical with i =1 to 5,
the x (O—$R^x$) units and the y (O—CO—$R^y$) units in the structural unit $[O-R^x]_x-[O-CO-R^y]_y$ are arranged in any order, $R^x$ is a linear alkylene radical having 2 to 4 carbon atoms or a branched alkylene radical having 3 or 4 carbon atoms, $R^y$ is a linear alkylene radical having 2 to 6 carbon atoms or a branched alkylene radical having 3 to 6 carbon atoms, or a cyclic alkylene radical having 3 to 6 carbon atoms, the radicals $R^x$ and $R^y$ are selected independently for each of the x (O—$R^x$) units and each of the y (O—CO—$R^y$) units; and iv. optionally one or more isocyanate-reactive compounds of the structure (III), which is different from the components used under i to iii:

$R^z$-$(A^z)_z$; with z =1 or 2 where $R^z$ is an aliphatic or aromatic radical, and $A^z$ is an OH, $NH_2$, or $CO_2H$ group, and m+n+x+y≥3, in an amount of 0.01 to 5 wt%, the weight-percentage figure being based on the overall formulation of the radiation-curable coating material composition.

3. The radiation-curable coating material composition as claimed in claim 2, wherein the radiation-curable polymer (a) is present at 30 to 99 wt %, at least one polyisocyanate adduct (b) is present at 0.01 to 5 wt %, and further components present comprise (c) 0 to 65 wt % of at least one reactive diluent and
(d) 0.5 to 5 wt % of at least one photoinitiator, the weight-percentage figures being based in each case on the overall formulation of the radiation-curable coating material composition.

4. The radiation-curable coating material composition as claimed in claim 2, wherein (a) urethane (meth)acrylates and polyester (meth)acrylate resins are used as radiation-curable polymer.

5. A leveling agent composition comprising:

0.01 to 5 wt % of the polyisocyanate adducts obtainable by reacting:

i. at least one polysiloxane which possesses the structure (I) below

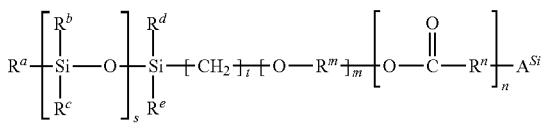

where t =2 to 30, m =0 to 100, n =0 to 100, s =1 to 400, $R^a$ is a halogenated alkyl radical having 1 to 30 carbon atoms, a linear alkyl radical having 1 to 30 carbon atoms, a branched or cyclic alkyl radical having 3 to 30 carbon atoms, or an aryl radical having 6 to 30 carbon atoms, or an alkylaryl radical or arylalkyl radical having 7 to 30 carbon atoms, all of $R^b$, $R^c$, $R^d$ and $R^e$ independently of one another are linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms, $R^d$ and $R^e$, moreover, independently of one another may be $R^a[SiR^bR^cO]_s$, where $R^a$, $R^b$, $R^c$, and s are as defined above and are selected independently therefrom, the m (O—$R^m$) units and the n (O—CO—$R^n$) units in the structural unit $[O—R^m]_m—[O—CO—R^n]_n$ are arranged in any order, $R^m$ is a linear alkylene radical having 2 to 4 carbon atoms or a branched alkylene radical having 3 or 4 carbon atoms, $R^n$ is a linear alkylene radical having 2 to 6 carbon atoms or a branched alkylene radical having 3 to 6 carbon atoms, or a cyclic alkylene radical having 3 to 6 carbon atoms, the radicals $R^m$ and $R^n$ are selected independently for each of the m (O—$R^m$) units and each of the n (O—CO—$R^n$) units, and $A^{Si}$ is an OH, $NH_2$, or $CO_2H$ group;

ii. at least one polyisocyanate having at least three NCO groups;

iii. at least one (meth)acrylate which possesses the structure (II) below:

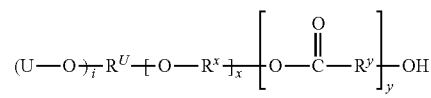

where x =0 to 100, y =0 to 100,

U is one of the following groups:

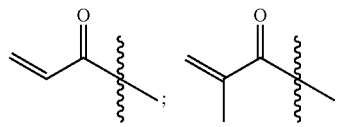

$R^U$ is a (i+1)-valent organic radical with i =1 to 5, the x (O—$R^x$) units and the y (O—CO—$R^y$) units in the structural unit $[O—R^x]_x—[O—CO—R^y]_y$ are arranged in any order, $R^x$ is a linear alkylene radical having 2 to 4 carbon atoms or a branched alkylene radical having 3 or 4 carbon atoms, $R^y$ is a linear alkylene radical having 2 to 6 carbon atoms or a branched alkylene radical having 3 to 6 carbon atoms, or a cyclic alkylene radical having 3 to 6 carbon atoms, the radicals $R^x$ and $R^y$ are selected independently for each of the x (O—$R^x$) units and each of the y (O—CO—$R^y$) units; and iv. optionally one or more isocyanate-reactive compounds of the structure (III), which is different from the components used under i to iii:

$R^z$-$(A^z)_z$; with z =1 or 2 where $R^z$ is an aliphatic or aromatic radical, and $A^z$ is an OH, $NH_2$, or $CO_2H$ group, and m+n+x+y≥3;

wherein the weight-percentage figure is based on the overall leveling agent composition.

6. A coating composition comprising:

0.01 to 5 wt % of the polyisocyanate adducts obtainable by reacting:

i. at least one polysiloxane which possesses the structure (I) below

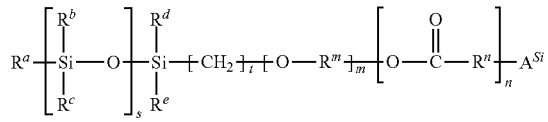

where t =2 to 30, m =0 to 100, n =0 to 100, s =1 to 400, $R^a$ is a halogenated alkyl radical having 1 to 30 carbon atoms, a linear alkyl radical having 1 to 30 carbon atoms, a branched or cyclic alkyl radical having 3 to 30 carbon atoms, or an aryl radical having 6 to 30 carbon atoms, or an alkylaryl radical or arylalkyl radical having 7 to 30 carbon atoms, all of $R^b$, $R^c$, $R^d$ and $R^e$ independently of one another are linear alkyl radicals having 1 to 6 carbon atoms, branched or cyclic alkyl radicals having 3 to 6 carbon atoms, or aryl radicals having 6 to 12 carbon atoms, or alkylaryl radicals or arylalkyl radicals having 7 to 12 carbon atoms, $R^d$ and $R^e$, moreover, independently of one another may be $R^a[SiR^bR^cO]_s$, where $R^a$, $R^b$, $R^c$, and s are as defined above and are selected independently therefrom, the m (O—R′″) units and the n (O—CO—R″) units in the structural unit $[O-R'''']_m-[O-CO-R'']_n$ are arranged in any order, $R'''$ is a linear alkylene radical having 2 to 4 carbon atoms or a branched alkylene radical having 3 or 4 carbon atoms, $R''$ is a linear alkylene radical having 2 to 6 carbon atoms or a branched alkylene radical having 3 to 6 carbon atoms, or a cyclic alkylene radical having 3 to 6 carbon atoms, the radicals $R'''$ and $R''$ are selected independently for each of the m (O—R′″) units and each of the n (O—CO—R″) units, and $A^{Si}$ is an OH, $NH_2$, or $CO_2H$ group;

ii. at least one polyisocyanate having at least three NCO groups;

iii. at least one (meth)acrylate which possesses the structure (II) below:

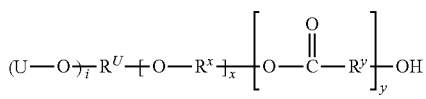

where x =0 to 100, y =0 to 100,
U is one of the following groups:

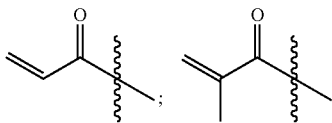

$R^U$ is a (i+1)-valent organic radical with i =1 to 5,
the x (O—$R^x$) units and the y (O—CO—$R^y$) units in the structural unit $[O-R^x]_x-[O-CO-R^y]_y$ are arranged in any order, $R^x$ is a linear alkylene radical having 2 to 4 carbon atoms or a branched alkylene radical having 3 or 4 carbon atoms, $R^y$ is a linear alkylene radical having 2 to 6 carbon atoms or a branched alkylene radical having 3 to 6 carbon atoms, or a cyclic alkylene radical having 3 to 6 carbon atoms, the radicals $R^x$ and $R^y$ are selected independently for each of the x (O—$R^x$) units and each of the y (O—CO—$R^y$) units; and iv. optionally one or more isocyanate-reactive compounds of the structure (III), which is different from the components used under i to iii:

$R^z$-$(A^z)_z$; with z =1 or 2
where $R^z$ is an aliphatic or aromatic radical, and $A^z$ is an OH, $NH_2$, or $CO_2H$ group,
and m+n+x+y≥3;

wherein the weight-percentage figure is based on the overall leveling agent composition; and wherein the coating composition exhibits reduced cratering, improved slip properties, reduced hazing, dirt-repellency, ease-to-clean or antiadhesive properties.

7. The method of claim 1, comprising adding to a composition 0.02 to 2 wt. % of the polyisocyanate adducts.

8. The radiation-curable coating material composition of claim 2, comprising at least one polyisocyanate adduct in an amount of 0.02 to 2 wt. %, the weight-percentage figure being based on the overall formulation of the radiation-curable coating material composition.

9. The leveling agent composition of claim 5, comprising 0.02 to 2 wt. % of the polyisocyanate adducts.

10. The coating composition of claim 6, comprising 0.02 to 2 wt. % of the polyisocyanate adducts.

11. The method of claim 1, wherein the at least one polyisocyanate having at least three NCO groups are oligomers that contain at least one of isocyanurate, biuret, iminooxadiazine-dione, urethane, carbodiimide, urea and uretdione groups.

12. The radiation-curable coating material composition of claim 2, wherein the at least one polyisocyanate having at least three NCO groups are oligomers that contain at least one of isocyanurate, biuret, iminooxadiazine-dione, urethane, carbodiimide, urea and uretdione groups.

13. The leveling agent composition of claim 5, wherein the at least one polyisocyanate having at least three NCO groups are oligomers that contain at least one of isocyanurate, biuret, iminooxadiazine-dione, urethane, carbodiimide, urea and uretdione groups.

14. The coating composition of claim 6, wherein the at least one polyisocyanate having at least three NCO groups are oligomers that contain at least one of isocyanurate, biuret, iminooxadiazine-dione, urethane, carbodiimide, urea and uretdione groups.

* * * * *